United States Patent [19]

Gruenwald

[11] Patent Number: 5,115,775
[45] Date of Patent: May 26, 1992

[54] INTERNAL COMBUSTION ENGINE WITH MULTIPLE COMBUSTION CHAMBERS

[75] Inventor: David J. Gruenwald, Hartford, Wis.

[73] Assignee: Titan Marine Engines, Inc., Stillwater, Okla.

[21] Appl. No.: 674,174

[22] Filed: Mar. 21, 1991

[51] Int. Cl.[5] .............................................. F02B 19/02
[52] U.S. Cl. .................................... 123/292; 123/256; 123/257; 60/39.62
[58] Field of Search ............... 123/256, 257, 275, 292; 60/39.6, 39.62

[56] References Cited

U.S. PATENT DOCUMENTS

| | | | |
|---|---|---|---|
| 892,296 | 6/1908 | Oberhansli | 123/250 |
| 1,204,986 | 11/1916 | Irwin | 123/292 |
| 1,406,877 | 5/1921 | Lemaire | 123/256 |
| 1,653,825 | 12/1927 | Saives | 123/274 |
| 1,849,347 | 3/1932 | Dale | 60/39.62 |
| 1,892,040 | 12/1927 | De Malvin De Montazet et al. | 123/531 |
| 2,197,901 | 4/1940 | Smith | 123/65 VB |
| 2,204,068 | 6/1940 | Chapman | 123/265 |
| 2,552,657 | 5/1951 | Ziegler | 123/292 X |
| 3,924,582 | 12/1975 | Yagi et al. | 123/256 |
| 4,248,192 | 2/1981 | Lampard | 123/256 |
| 4,372,264 | 2/1983 | Trucco | 123/255 |
| 4,401,072 | 8/1983 | Ito et al. | 123/292 |
| 4,440,124 | 4/1984 | Eckert | 123/261 |
| 4,641,616 | 2/1987 | Lampard | 123/256 |
| 4,846,125 | 7/1989 | Hareyama et al. | 123/292 |
| 4,858,567 | 8/1989 | Knapp | 123/52 M |

FOREIGN PATENT DOCUMENTS

| | | |
|---|---|---|
| 0111446 | 9/1940 | Australia . |
| 2528941 | 1/1977 | Fed. Rep. of Germany . |
| 0996589 | 12/1951 | France . |
| 1276719 | 3/1962 | France . |
| 1322958 | 6/1963 | France . |
| 2278920 | 2/1976 | France . |
| 1433508 | 4/1976 | United Kingdom . |

*Primary Examiner*—Willis R. Wolfe
*Attorney, Agent, or Firm*—Whyte & Hirschboeck

[57] ABSTRACT

An internal combustion engine having two separate main combustion chambers isolated from the cylinder and from each other by means of a valve throttle mechanism. Combustion occurs first in one chamber, and then in the other, separated by one complete revolution of the crankshaft in the two-cycle embodiment and two complete revolutions of the crankshaft in the four-cycle embodiment. The alternative operation effectively removes the combustion process from the cycle for a sufficient amount of time to enable the combustive reactions to approach chemical equilibrium prior to release in the cylinder.

5 Claims, 4 Drawing Sheets

INTERNAL COMBUSTION ENGINE WITH MULTIPLE COMBUSTION CHAMBERS

BACKGROUND OF THE INVENTION

1. Field of Invention

This invention relates to internal combustion engines and to both spark-ignited and diesel operated engines, and particularly to improvements in the engine combustion chambers.

2. Prior Art

The diesel engine is a highly efficient converter of fuel energy into mechanical energy. Brake thermal efficiencies in excess of 50% have been proven in production two-cycle diesels that are highly turbocharged. Diesel engines gain this significant efficiency mainly by avoiding throttle losses and by having a generous expansion ratio. The engine load is controlled solely by reducing or increasing fuel consumption. Fuel is burnt rapidly, and completely, even when the engine is lightly loaded. At all times the heat so produced is expanded by means of a large and efficient expansion ratio. Because of these factors, diesel engines exhibit significant potential to meet current and future demands for reduced emissions and high fuel economy. However, the advantages are to a large extent sacrificed when a diesel engine is designed to fill the exacting requirements of vehicular use, and must conform to performance standards set by spark-ignited gasoline engines. The main disadvantage of diesel engines lies in the requirements of high working pressures to make the cycle of operations practical. The engines are subjected to high peak cylinder pressures requiring a high degree of attention to material strength and tolerances used in their manufacture. Generally, for a given output, diesel engines cost twice as much to manufacture as a gasoline engine of comparable output. Even with the best alloys, diesel engines are invariably heavier than gasoline engines. Further, the demands of the combustion process on the injection system make very high speeds difficult to achieve efficiently. The high peak pressures occurring during combustion also create shock waves that are transmitted through the engine castings, producing objectionable noise and torsional vibrations that are difficult to control. Power flow is not as smooth as an equivalent gasoline engine.

In order to approach the normal operating speeds of current gasoline engines, a diesel engine combustion system requires a high degree of turbulence and mixing in the combustion chamber in order to rapidly and completely mix the fuel and air in the relatively short time available for combustion. While this works well, and comparatively high engine speeds can be obtained, the high degree of mixing and turbulence degrades the diesels' efficiency. Agitation of air takes place during the compression process, and this compression must result in the attainment of a sufficiently high temperature to readily ignite the injected fuel. Energy losses caused by high turbulence and swirl materially reduces the desirable heat of compression. To compensate for this loss, high speed diesels require a higher compression ratio. This further increases the peak cylinder pressures and increases the heat transfer losses out of the combustion chamber due to the high turbulence and its scrubbing effect on the thermal layer of air that insulates the combustion gases.

Thus, completion of the diesels' complex combustion process in the short time available as the piston approaches top dead center, is the major reason for deficiencies in performance when compared to gasoline engines. The present invention anticipates introduction of a diesel engine with all of the inherent advantages, while being significantly smaller, cleaner, quieter and more powerful without a loss in durability, and without an increase in weight or decrease in efficiency.

There have been many previous attempts to decrease the time required for the combustion process to be completed. These past efforts have all centered on ways to complete combustion near top dead center and in the current cycle of rotation of the engine.

A review of earlier concepts involving multiple chambers communicating with individual cylinders of an internal combustion engine reveals two patents issued to one R.D Lampard, namely U.S. Pat. Nos. 4,248,192 and 4,641,616. Each of these publications disclose a main combustion chamber and a pilot charge chamber. Combustion is initiated in the pilot charge chamber, and then the pilot charge and the main charge are brought together by means of selective timing of a valve mechanism. Although the valve mechanism would initially appear to be of the general configuration of the valve in the present concept, the function is completely different. In both of these patents, combustion always occurs while the piston is passing over top-dead-center (TDC). The combustion process is never removed from the cycle during a complete revolution of the engine, but rather is "delayed" for a short period of time. The patents also focus on configuration providing a different compression ratio in each combustion chamber, high compression created in the main chamber and low compression in the pilot charge chamber. The preferred embodiment disclosed is directed to spark-ignited gasoline engines.

U.S. Pat. No. 2,197,901 issued to Smith presents a four-cycle, spark-ignited engine which relies on two chambers for each combustion to occur during each cycle, again, not being separated by means of a full rotation of the crank shaft. U.S. Pat. No. 892,296 issued to Oberhansli, the DeMalvin DeMontazet, et al., U.S. Pat. No. 1,892,040 and U.S. Pat. No. 1,653,825 granted to Saives each seek to complete combustion near top-dead-center during the combustion producing portion of the cycle in some combination of main and prechambers. Communication between chambers is determined by the timing of a valve.

The Trucco U.S. Pat. No. 4,372,264 provides a means utilizing a small fraction of the combustion products from the prior combustion process in either a spark-ignited or a diesel engine, to "preheat and vaporize" a small amount of relatively poor quality fuel in a prechamber. The prechamber is isolated from the main chamber by valve means. Here, again, combustion occurs over a relatively short period of time when the piston is near top-dead-center, and not over a potential of 360° of crank shaft rotation, as disclosed herein.

The U.S. Pat. No. 1,204,986 granted to Irwin teaches protection of a spark plug from the fuel/air mixture, until just prior to the beginning of combustion, in order to minimize spark plug fouling. Combustion occurs rapidly near top-dead-center of the crankshaft rotation.

BRIEF SUMMARY OF THE INVENTION

The present invention provides an improved combustion chamber for an internal combustion engine, and is applicable to both spark-ignited and diesel engines, whether the engines are two-cycle or four-cycle machines. The improvement provides means for removing the normal combustion process time constraints incident to the cycle of operation. The invention accomplishes this by providing multiple primary or main combustion chambers isolated from one another and each communicating directly with individual cylinders. Only one of the chambers will be in the process of combustion, while the other is in the process of releasing combustion products back into the cylinder. The combustion chambers respectively communicate with the cylinder via a passageway leading to the individual chambers. Flow through the passageway is controlled by a valve mechanism similar to a hydraulic spool valve. Each valve mechanism is opened and closed in accordance with the desired air flow into and out of the respective chambers. During the cycle of operation, there occurs a time near top-dead-center when both valves will be open for a small period of time. This period is referred to as the "supercharge period." During the supercharge period, air utilization and initial temperature and pressure of the fresh air mass is improved by forcing a larger percentage of the clearance volume into the combustion chamber than would normally be accomplished by conventional mechanical means. Although the present concept presents particular benefit to diesel engines to overcome inherent deficiencies outlined earlier, it will also find application in improving spark-ignited engines. Further, applications of the concept presented herein is independent of the internal combustion engine type, which may be either two-cycle or four-cycle, or rotary, or piston driven type. The actuating mechanism for the valves controlling communication of the trapped air mass into and out of the multiple main combustion chambers may be accomplished by conventional means, such as a camshaft with rocker arms, or electronically, using stepper motors, or by hydraulic mechanism.

It is important to note that the improved combustion chambers of this invention are not "pre-chambers" disclosed in the prior art, and wherein a portion of the combustion process occurs in the pre-chamber to then be transferred into another main chamber for completion of combustion, all occurring within the same cycle. The present invention provides a means wherein essentially all of the combustion occurs in the respective combustion chambers, with only a small amount of "incidental" combustion occurring in the cylinder, and then only if this amount proves to be desirable for reduced emissions. The present improved internal combustion engine differentiates from the prior art by alternate operation taking place in a respective isolated combustion chamber which is in parallel operating relationship with another identical combustion chamber. This differentiates from conventional engine types utilizing both pre-chambers and a main combustion chamber in series to complete the combustion process in the same cycle to produce expansion of the gases into useful work.

Combustion in the improved chambers will occur in a different manner for each engine type. Should the cycle chosen be of the diesel type, then combustion will occur by means of heat of compression. In the Otto cycle, combustion will occur with the introduction of a spark into the chamber for fuel ignition. Fuel enters the respective compressed air mass by means of injection into the improved chambers or, in the case of spark ignition, by means of normal carburetion into the incoming air mass, or directly into the chamber via a fuel injector, in the case of a direct injected spark-ignited two-cycle engine. Thus, it will be readily apparent to those familiar with the art that the present invention is not to be limited to any particular type of internal combustion engine, or a particular cycle of operation, but is applicable to all currently practiced internal combustion engine types of the cyclic combustion type.

BRIEF DESCRIPTION OF THE DRAWINGS

The invention is further described with reference to the accompanying drawings in which.

DETAILED DESCRIPTION

Figure 1:
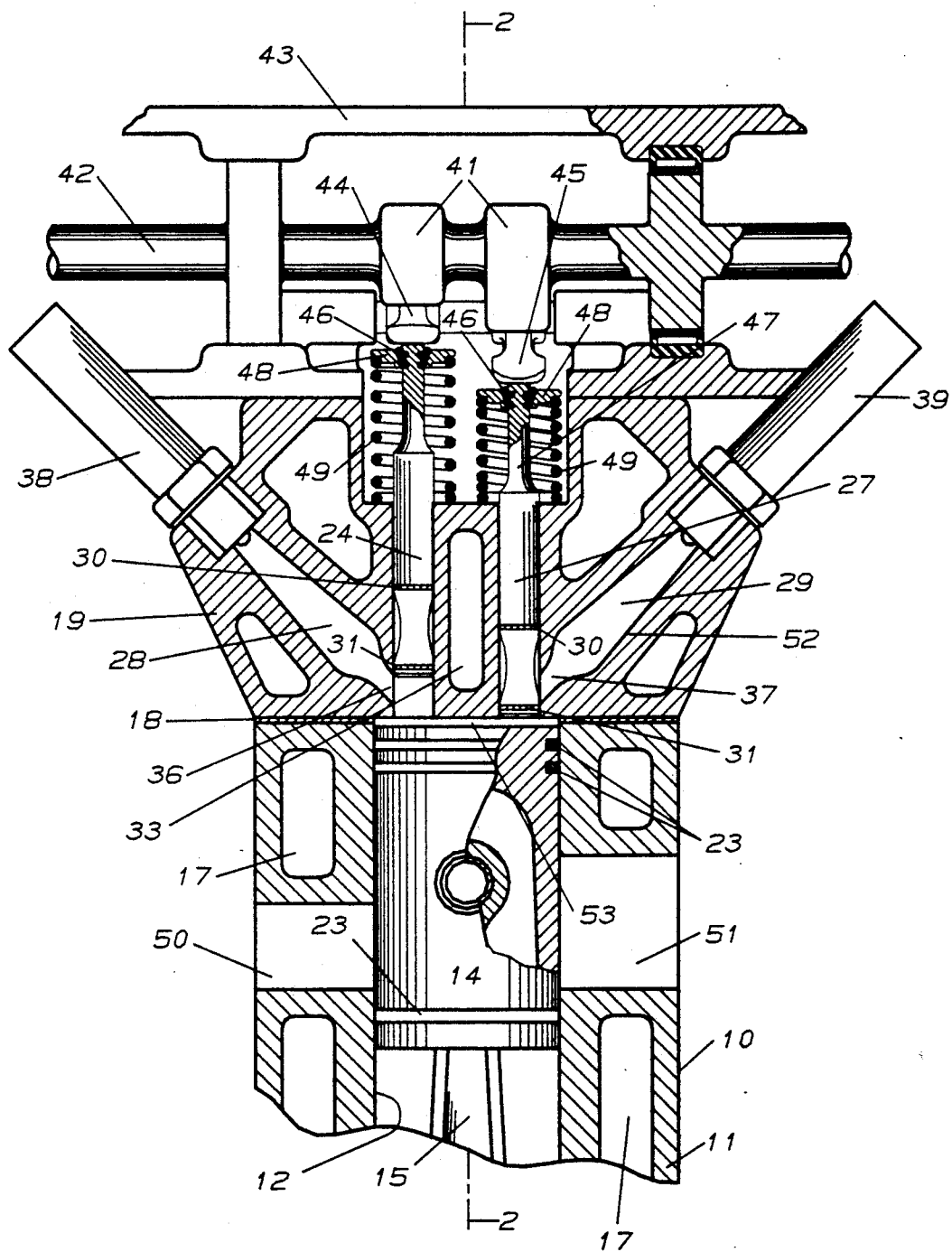
FIG. 1 is a fragmenting longitudinal view, partially in section, of a portion of a two-cycle internal combustion engine constructed in accordance with this invention.
Figure 2:
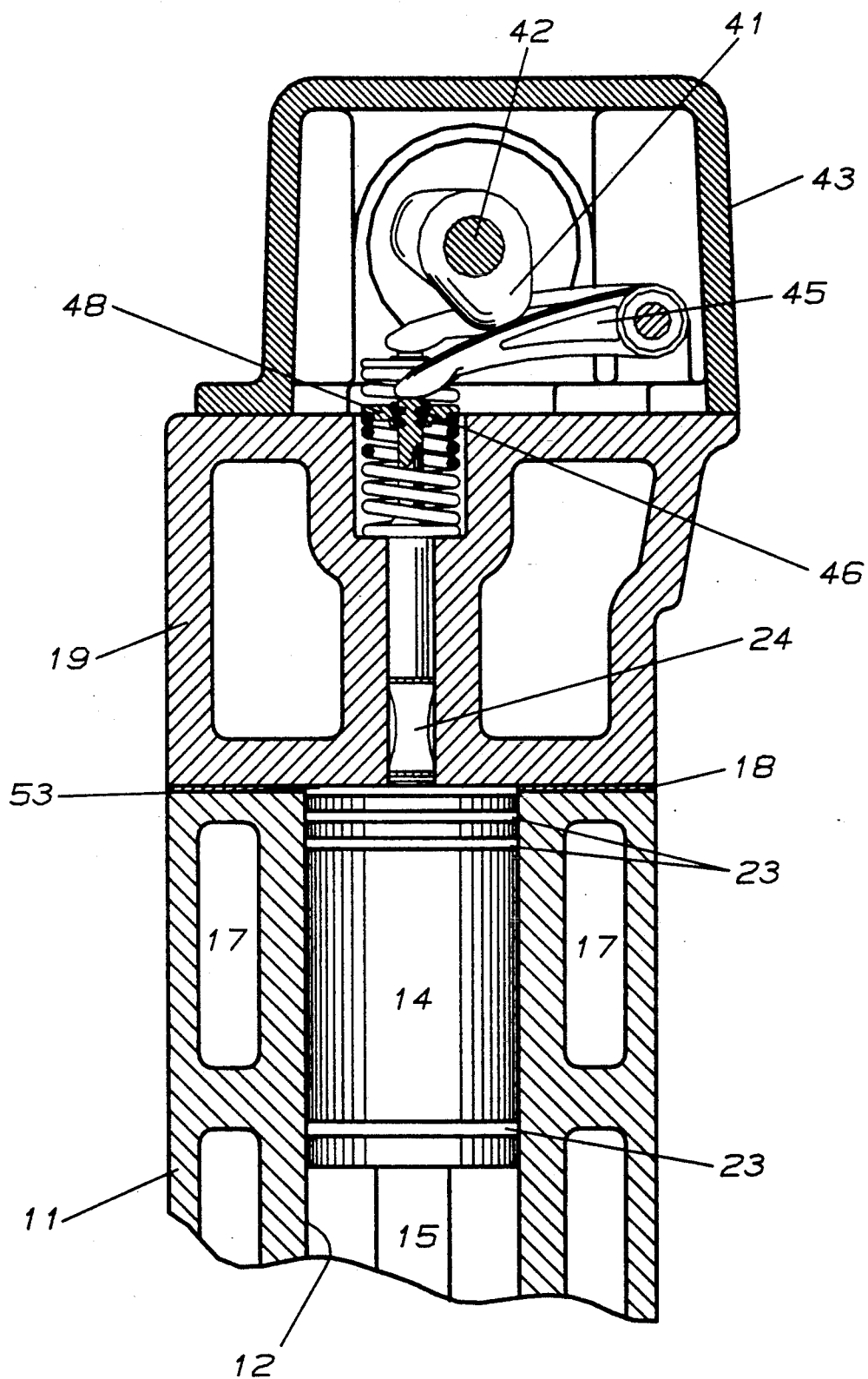
FIG. 2 is a longitudinal view taken partially in section along lines 2—2 of FIG. 1.

In the preferred embodiment of this invention, as illustrated in the drawings, a portion of a compression ignition, two-cycle internal combustion engine is disclosed to indicate the improvements of the present concept.

The engine, indicated generally by the reference 10, includes a conventional cylinder block 11, with a number of identical piston-containing cylinders 12, only one of which, together with its reciprocating piston 14 is shown. In FIG. 1, the piston is shown near its top-dead-center (TDC), joined to a connecting rod 15, and arranged for reciprocable vertical movement within the cylinder 12 and cooled by water jackets 17.

The opening of the cylinder 12 is closed by means of a cylinder head gasket 18 seated between the cylinder block 11 and a cylinder head 19. The gasket 18 seals the essentially flat surface of the cylinder head 19 and the cylinder block 11. Piston rings 23 act in a conventional manner to seal the piston 14 during its reciprocal operation. Individually operated throttle valves 24 and 27 are respectively provided for each of independent combustion chambers 28 and 29. The novel chambers 28, 29 which form a part of the improved engine of this invention, will be described in more detail herein below. The throttle valves 24, 27 each contain axially spaced sealing rings 30 and 31, respectively, for stopping leakage of high pressure gases. The valves are preferably disposed at opposite sides of cooling jackets 33.

The individual throttle valves 24, 27 alternatively admit air inducted by the cylinder 12 and its reciprocating piston 14 into the individual combustion chambers 28 and 29 served by the respective throttle valves 24, 27 via respective passageways 36 and 37. There is preferably provided at least one fuel injector 38 and 39 for the respective chambers 28 and 29. The respective fuel injectors 38, 39 introduce fuel into the trapped air mass for purposes of combustion.

A camshaft 42, rotationally supported in the cover 43, is driven in the usual manner, and resides above and in mechanical contact with rocker arms 44 and 45 to control the operation of the respective throttle valves 24 and 27. Split, tapered valve spring key assemblies 46 and 38 have inner flanged portions for retention within grooves in the upper portion of each valve stem 47 (see FIG. 4 for detail). The valve key assemblies are conventionally seated within an abutting tapered opening in a valve spring retainer 48 and 37 to act as a stop for a compression valve spring 49. Each spring 49 acts to bias respective valve members 24 and 27 in an upward direction with respect to FIG. 1. Independent operation of the respective valves 24, 27 provides a means for entrapping the compressed air mass in the respective combustion chambers 28 and 29. The entrapment may be accomplished for a period of one full crankshaft rotation in a two-cycle operation or for two full crankshaft rotations in a four-cycle operation, as will be hereinafter described.

During engine operation a fresh air charge is drawn into a cylinder 12 through an inlet port 50 communicating with the peripheral wall of the cylinder 11 upon downward movement of the piston 14. One of the two throttle valves 24 or 27 will be opened at the time of entry of fresh air into the cylinder 12. The combustion chamber 28 with its open throttle valve 24, as shown in FIG. 1, will have released its combustion products into the cylinder 12 exhausting the products through an exhaust port 51, communicating with the periphery of the cylinder 12. The chamber 28 then awaits a fresh air charge. The combustion chamber 29, with its closed throttle valve 27, will have trapped a fresh air charge, and which charge will be absorbing heat from the surrounding chamber walls 52 in anticipation of the start of combustion. At some point consistent with the required time needed for completion of the combustion process, the fuel injector 39 in the closed chamber 29 will begin to inject a fuel mass into the trapped air charge. For purposes of understanding the invention, the initiation of fuel injection is assumed to begin at bottom dead center (BDC) and progress until approximately 20° prior to top dead center (TDC). As the piston 14 travels vertically upwardly within the cylinder 12, it pushes the fresh air charge in the cylinder 12 into the combustion chamber 28, and wherein the charge is compressed with its temperature rising to slightly above the autoignition temperature of the particular fuel used. During this time, injection of fuel into the trapped air mass of the chamber 29 is proceeding in a slow and orderly manner consistent with minimum ignition delay and with minimal audible diesel "knock".

Shortly before TDC, the throttle valve 24, controlling chamber 28, will begin to close while the throttle valve 27 communicating with the chamber 29 will begin to open. As the throttle valve 27 begins to open, high pressure gases from the completed products of combustion in chamber 29 will travel through the passage 37 and into the small clearance volume 53 existing between the upper surface of the piston 14 and the cylinder head 19. These combustion products will then force the remaining fresh air mass in the clearance volume 53 into the chamber 28. The throttle valve 24 will be closed at some appropriate time by its rocker arm 44 to control the final pressure, temperature and exhaust gas recirculation of the trapped air mass in chamber 28. Shortly after TDC, the throttle valve 24 in chamber 28 will become fully closed, and at the same time the throttle valve 27 in chamber 29 will continue to open as the piston 14 is forced downwardly in the cylinder 12 by the high pressure gases formed above the piston 14.

An important feature of the present invention is that the peak pressures encountered in the cylinder 12 can be controlled or limited by the rate of opening of the respective throttle valves 24, 27. Thus, the high pressures encountered during normal diesel combustion will be isolated from the cylinder 12 and occur only in the combustion chambers 28 and 29. This feature enables the engine designer to design an engine which may be far less robust and, consequently, lighter, at the same time the improved engine will produce the same average piston pressure, or brake mean effective pressure (BMEP) on the down stroke of the piston 14.

Although not specifically shown, it is within the province of this invention to provide a direct injected, spark-ignition, two-cycle engine by providing at least one spark plug in each of the combustion chambers 28 and 29. The compression ratio may then be reduced to a value consistent with avoidance of "knock" in engines of this type.

Figure 3:
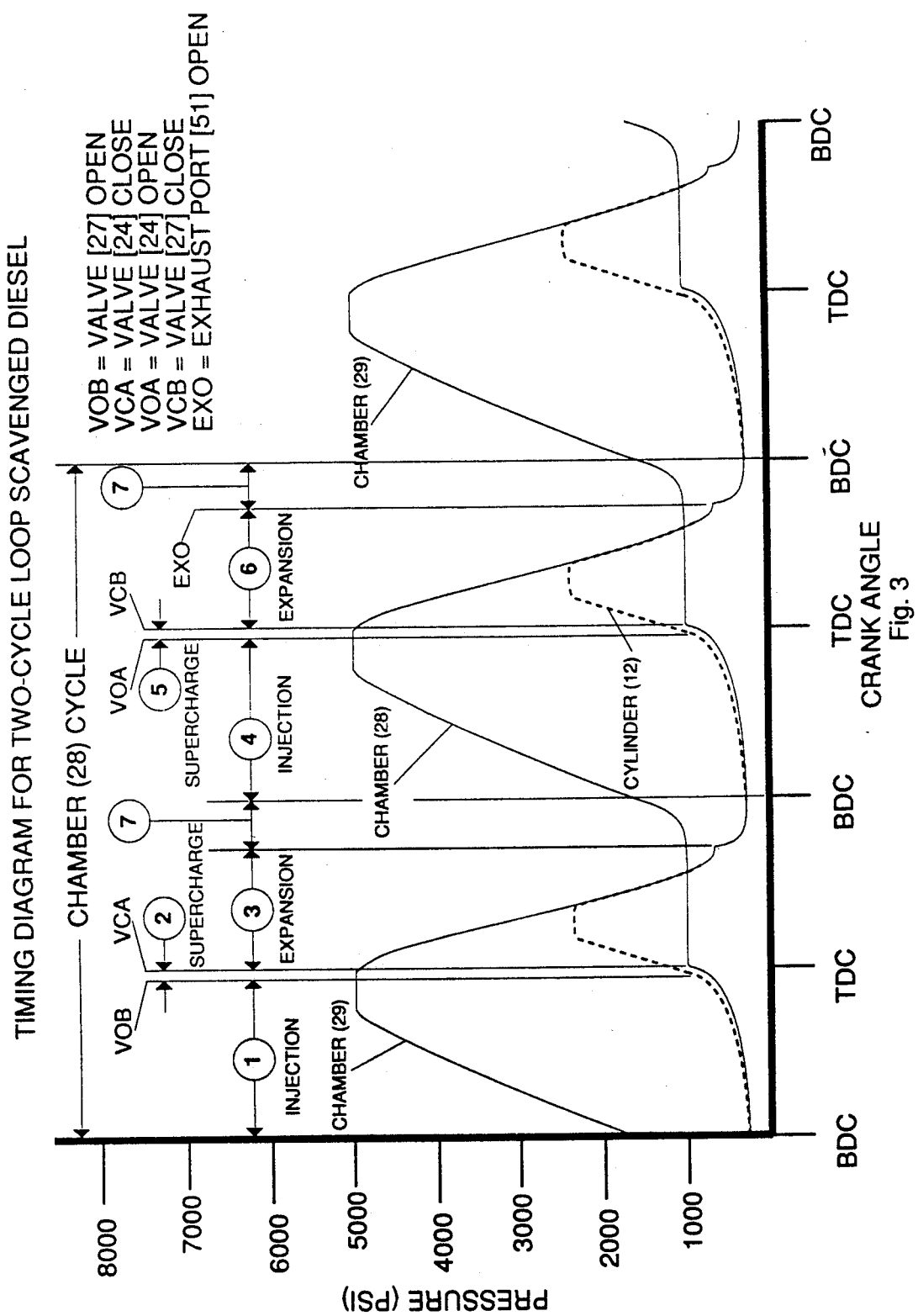
FIG. 3 is a pressure-volume timing diagram corresponding to a two-cycle internal combustion engine constructed in accordance with this invention.

The timing diagram of FIG. 3 provides an illustration of the various phases of operation of the improved engine, and provides a pressure versus volume diagram indicating the timing cycle for a two-cycle, loop scavenged diesel engine. The solid line curve indicates the pressure existing in the respective combustion chambers 28 and 29, while the dotted-line curve indicates pressure existing in the cylinder 12. The cycle progresses from left to right with the encircled numbers representing specific events. Event 1 illustrates the injection of fuel into the chamber 29 while the piston 14 is travelling from BDC to TDC. The pressure in chamber 29 is shown to reach a maximum value and then level off to indicate that combustion has been completed. Slightly before TDC, the chamber 29 throttle valve 27 will begin to open, and at the same time the chamber 28 throttle valve 24 will begin to close. Since both valves 24 and 27 are open, flow will occur from chamber 29 into chamber 28 forming the supercharge, indicated at event 2. During this period of time, the pressure in chamber 28 will begin to increase along with the pressure in the cylinder 12. At event 3, which is the expansion event, controlled by the rate of opening of the throttle valve 27 in chamber 29, the pressure in the cylinder 12 will be limited to a maximum value consistent with the strength of the components of the engine required for accommodating normal expansion of gases. This pressure will be maintained until the exhaust port 51 is uncovered. The cylinder pressure will then rapidly drop to the pressure in the exhaust system of the engine. Event 4 illustrates a repeat of the previous series of events, excepting that chamber 28 will form combustion products. After chamber 29 completes the same events, that the chamber 28 has just completed, the combustion cycle will again repeat with every other crankshaft rotation in the two-cycle process.

Figure 4:
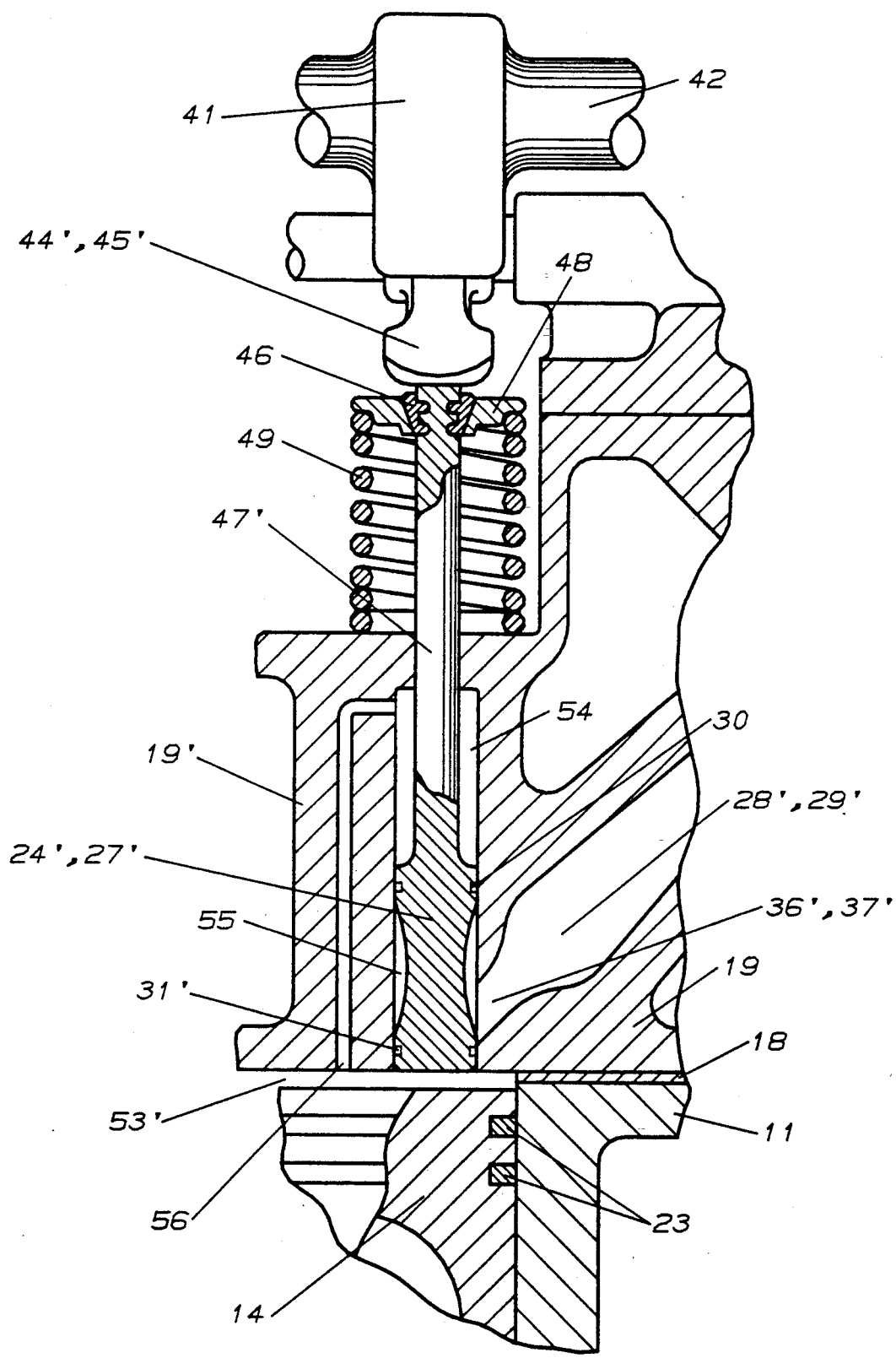
FIG. 4 is a detailed fragmentary view, partially in section, disclosing particulars of a valve mechanism in accordance with the present invention.

FIG. 4 illustrates, in partial cross section, a particular embodiment of a throttle valve illustrating details of a means for balancing the loads upon a valve 24,27 due to cylinder pressures and combustion chamber pressure. In this view, as in the case of other figures of the drawings, the same reference numerals have been provided to indicate identical parts.

In the FIG. 4 embodiment, a cylinder head 19' defines a cylindrical base 54 into which a throttle valve 24', 27' moves in reciprocable axial directions. An undercut area 55, intermediate the valve sealing rings 20', 31', allows the high pressures from the combustion chamber 28', 29' to travel through its respective passageway 36', 37' and surround the valve 24', 27' to thus produce minimum side thrust. A passageway 56 is provided to enable the high pressure in the cylinder to act on both sides of the throttle valve 24', 27' in order to minimize the net loads acting on the valve. The passageways communicates at one end with the clearance volume 53' existing between the piston 14 and the cylinder head 19, and at the other end with the bore 54 existing above the valve 24', 27'.

It will be apparent that this invention will provide noticeable improvement in three undesirable characteristics of conventional engines, and particularly diesel engines, namely undesirable emissions, obnoxious noise and low power density.

Less Emissions

Oxides of nitrogen have been proven to be caused primarily by a high burning rate during rapid premixed combustion and by high operation temperatures. The present invention permits a very slow burning rate to occur by controlling the time available for a longer injection period. As described earlier, this may be accomplished by the arrangement of the respective rocker arms 44 and 45 with relation to one another and to the rotation of the crankshaft 42, or by means of separate electrical or hydraulic devices controlling the respective independently operable throttle valves. This slow burning rate minimizes the formation of oxides of nitrogen. Further, the average temperature of combustion, affecting formation of undesirable oxides of nitrogen can be controlled or limited by the rate of heat transfer through properly designed walls of the respective combustion chambers.

Combustion will be completed with less hydrocarbon and particulate emissions, than in the case of conventional engines, since the combustion occurs at constant volume, with all of the products of combustion being held in close proximity to one another throughout the duration of combustion. This makes the likelihood of reaching chemical equilibrium far greater than in a conventional engine. Hydrocarbon and particulate emissions will be greatly reduced, since the fuel and air masses have far more time to mix and oxidize. In addition, the preheating of the fresh air charge, which occurs after the charge has been admitted into a respective combustion chamber, but before combustion has begun, will minimize ignition delay as well as provide a more favorable environment for the reduction of particulates.

Decreased Noise

In the case of diesel engines, noise is caused by an excessively rapid rise in pressure in the cylinder of the engine during combustion. The main contributor to this excessive pressure rise is ignition delay and the time lag between the first onset of fuel leaving the injector and the time when fuel actually begins to burn. Thus, the longer the delay period, the greater the amount of fuel in the chamber prior to the start of combustion. Once fuel begins to burn, the chamber will heat up very rapidly and consume much of the fuel that has left the injector up to this point of operation. Almost in an instant, there will be an effect similar to an explosion, rather than a controlled burning. This is the noise recognized as "knock" in a diesel engine. It is most prevalent under very light loads, such as during idle.

One proven method for minimizing knock has been to heat the air charge to a higher temperature, and another has been to inject a small amount of fuel into the chamber first, and allow this fuel to burn and heat up the air mass with a follow-up injection of the main fuel charge. This is known as pilot injection. The difficulty in using pilot injection is that it must occur close to top dead center, or the air will not have been sufficiently compressed and heated to autoignite the fuel. Since there is a finite time required to inject the remaining fuel mass, there is a shortage of time for both pilot and main injection to occur, making effective pilot injection difficult to achieve in actual practice.

The present invention provides a means for preheating the air charge by a two-stage operation; first transferring heat from the walls of the chamber into the air mass prior to combustion, and second by increasing compression of the air mass during supercharge. Supercharge raises the temperature and pressure of the gases to a level considerably higher than that which would be achieved by normal compression at a selected compression ratio. Finally, the greatly increased time available to complete the combustion process will allow true pilot injection to occur prior to main injection. All three of these advantages, preheat, supercharge and pilot injection are a part of this present design and will minimize, if not essentially eliminate classic diesel knock.

Improved Power Density

Power density is measured in two ways; horsepower per pound of engine and horsepower per cubic foot of engine. Current diesel engines cannot compete favorably in power density with alternatives, such as spark-ignited gasoline engines and turbines. Primarily, this is because of the peak cylinder pressures encountered when the brake mean effective pressure (BMEP) is increased. However a BMEP of 400 or even 800 psi will not cause damage to the internal structure of a diesel engine, providing it is not accompanied by a correspondingly high peak cylinder pressure. If BMEP can be achieved by a constant 800 psi in the cylinder at all times from TDC to BDC, rather than approximately 3,000 psi at TDC and 50 psi at bottom-dead-center as in conventional engines, the improved engine can obviously be made much lighter. The present invention makes the control of peak cylinder pressure possible by means of varying the rate of opening of the throttle valves. In this way, only the combustion chambers need be made sufficiently robust to withstand the pressures encountered therein during combustion. Thus, the engine may be made lighter and smaller with consequent improvements in power density.

Greater Efficiency

It is recognized that heat transfer out of the combustion chamber provides an undesirable energy loss that tends to be higher as the combustion chamber surface to volume ratio is increased over that of the direct injected open chamber diesel engine. However, the transfer of heat energy into the air charge from the chamber walls prior to the onset of combustion is a desirable heat addition to the cycle. In the present invention, the heat addition duration may be modified so as to occur for a far greater crankshaft rotation angle than the heat subtracted during the combustion process. For example, there are 360 crankshaft degrees available for the combustion process, but it is very unlikely, given the constant volume nature of the combustion process in engines utilizing this invention, that more than 80° will be needed for combustion. This means that the compressed air mass may reside in the combustion chamber for 280° of crankshaft rotation, absorbing heat from the chamber walls and producing an efficiency gain. Combustion may then commence for the remaining available 80°, during which time there will be an efficiency loss as heat is transferred out of the chamber. This "balancing" of time and heat transfer will tend to negate each other and result in minimal net loss due to heat transferred out during the cycle. Further, if maximum efficiency is desired without regard for peak cylinder pressures, the combustion gases may be admitted back into the cycle very rapidly near top dead center. The time of introduction will be limited only by the rapidity with which the throttle valve can be opened. This method of heat addition into the cycle will approach constant volume heat addition to a far greater degree than in conventional engines which more closely reflect a constant pressure process which has been proven to be less efficient. Throttle losses into and out of the combustion chamber may be minimized by designing the passageways to be made very large, since they are not meant to create high turbulence as in conventional pre-chamber diesel engines. Combustion gases flow into a very small clearance volume at top dead center, and therefore the pressure differential loss across the throttle valves will be quickly equalized. Throttle losses may then be controlled by the size of the passageway at the entry of the combustion chamber presenting a relatively large cross section. In this way, the present invention permits "tailoring" of the operating characteristics of the engine for high efficiency, high power density, or a comprise between these two characteristics, whichever is considered to be most reasonable for a particular application.

I claim:

1. In a two-cycle compression ignition engine including at least one cylinder, a reciprocable piston movable in said cylinder, a piston connecting rod, a crankshaft for operation of said piston connecting rod, a cylinder head enclosing said cylinder, the upper surface of said piston and the enclosing surface of said cylinder head defining a cylinder clearance volume, a first combustion chamber and a second combustion chamber located in said cylinder head, said combustion chambers being independently isolated from one another and from the clearance volume and each chamber defining a passageway in communication with said cylinder clearance volume, an independently operated throttle valve for each combustion chamber and arranged for opening and closing said passageway associated with its respective chamber, and control means for selective operation of a respective throttle valve; the improvement comprising means for isolating the combustion process for one full 360° rotation of said crankshaft; wherein the combustion chambers alternatively provide for expansion of combustion products in the respective chambers into the cylinder volume near top dead center upon each revolution of the crankshaft.

2. The improvement as claimed in claim 1, wherein said first and second combustion chambers each include at least one independently selectively operated fuel injector, and where said throttle valve control means comprises a camshaft driving axially spaced, laterally extending, rocker arms, via a valve operating lobe contracting the distal ends of each rocker arm, said rocker arms from said camshaft and positioned angularly relative to one another from individual operation of a respective throttle valve.

3. The improvement as claimed in claim 2, wherein a compressing spring is provided for biasing an associated throttle valve towards valve open position and said rocker arm operatively associated with a respective throttle valve is arranged to selectively urge its valve towards valve closed position against the bias of said spring.

4. The improvement as claimed in claim 1, wherein said cylinder head includes a cylindrical base including an apertured enclosure at one end and said throttle valve being located within said enclosure and having a stem portion slidably received in said enclosure aperture, and a second passageway in said cylinder head communicating at one end with the said cylindrical base at a point lying above said throttle valve and at its opposite end with said cylinder clearance volume.

5. The improvement as claimed in claim 4, wherein said second passageway is of L-shape configuration.

* * * * *